(12) United States Patent
Achten et al.

(10) Patent No.: US 11,555,088 B2
(45) Date of Patent: Jan. 17, 2023

(54) DUAL CURE METHOD USING ZEREWITINOFF-ACTIVE H TIN CATALYSTS

(71) Applicant: Covestro Deutschland AG, Leverkusen (DE)

(72) Inventors: Dirk Achten, Leverkusen (DE); Thomas Büsgen, Leverkusen (DE); Christoph Tomczyk, Leverkusen (DE); Jan Weikard, Leverkusen (DE); Frank Richter, Leverkusen (DE); Roland Wagner, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 504 days.

(21) Appl. No.: 16/497,562

(22) PCT Filed: Mar. 26, 2018

(86) PCT No.: PCT/EP2018/057668
§ 371 (c)(1),
(2) Date: Sep. 25, 2019

(87) PCT Pub. No.: WO2018/178028
PCT Pub. Date: Oct. 4, 2018

(65) Prior Publication Data
US 2021/0087324 A1    Mar. 25, 2021

(30) Foreign Application Priority Data

Mar. 27, 2017  (EP) .................... 17162957.9

(51) Int. Cl.
| | |
|---|---|
| *C08G 18/24* | (2006.01) |
| *B33Y 70/00* | (2020.01) |
| *C08G 18/67* | (2006.01) |
| *C08G 18/79* | (2006.01) |
| *C09D 11/101* | (2014.01) |
| *C09D 11/102* | (2014.01) |
| *C09D 11/38* | (2014.01) |
| *B33Y 10/00* | (2015.01) |
| *B29C 64/124* | (2017.01) |
| *B29K 33/04* | (2006.01) |
| *B29K 75/00* | (2006.01) |
| *B29K 105/00* | (2006.01) |

(52) U.S. Cl.
CPC ............ *C08G 18/242* (2013.01); *B33Y 70/00* (2014.12); *C08G 18/672* (2013.01); *C08G 18/792* (2013.01); *C09D 11/101* (2013.01); *C09D 11/102* (2013.01); *C09D 11/38* (2013.01); *B29C 64/124* (2017.08); *B29K 2033/04* (2013.01); *B29K 2075/00* (2013.01); *B29K 2105/0002* (2013.01); *B33Y 10/00* (2014.12)

(58) Field of Classification Search
None
See application file for complete search history.

(56) References Cited

U.S. PATENT DOCUMENTS

| | | | |
|---|---|---|---|
| 8,318,830 B2 | 11/2012 | Kohli Steck et al. | |
| 8,835,021 B2* | 9/2014 | Yersin | C07F 9/5045 |
| | | | 313/506 |
| 8,946,372 B2 | 2/2015 | Richter et al. | |
| 2015/0240024 A1 | 8/2015 | Richter et al. | |
| 2015/0252138 A1 | 9/2015 | Richter et al. | |
| 2016/0090499 A1* | 3/2016 | Valeton | H01L 21/288 |
| | | | 438/46 |
| 2016/0136889 A1 | 5/2016 | Rolland et al. | |
| 2018/0009931 A1 | 1/2018 | Maleika et al. | |

FOREIGN PATENT DOCUMENTS

| | | | | |
|---|---|---|---|---|
| CA | 2680969 A1 | * | 4/2010 | ......... C08G 18/4277 |
| CA | 2859566 A1 | * | 6/2013 | ............ C08G 18/10 |
| CN | 103172801 A | | 6/2013 | |
| CN | 104745055 A | | 7/2015 | |
| DE | 102008021980 A1 | * | 11/2009 | ......... B01J 31/0211 |
| DE | 102009051445 A1 | * | 5/2011 | ......... B01J 31/0201 |
| GB | 899948 | * | 6/1962 | |
| TW | 526207 A | * | 4/2003 | .......... C07C 211/65 |
| TW | 1259189 | * | 8/2006 | .............. A01H 1/08 |
| WO | WO-2009050115 A1 | | 4/2009 | |

OTHER PUBLICATIONS

International Search Report for PCT/EP2018/057668 dated Jun. 8, 2018.
Written Opinion of the International Searching Authority for PCT/EP2018/057668 dated Jun. 8, 2018.

* cited by examiner

*Primary Examiner* — Timothy Kennedy
*Assistant Examiner* — Guy F Mongelli
(74) *Attorney, Agent, or Firm* — Jed C. Benson

(57) ABSTRACT

The invention relates to a method for producing an object from a construction material, the construction material comprising radically crosslinkable groups, NCO groups and groups having Zerewitinoff active H atoms, and the object being a three-dimensional object and/or a layer. During and/or after the production of the object, the construction material is heated to a temperature of >50° C., and the construction material comprises one or more cyclic tin compounds of formula F-I, F-II and/or F-III.

15 Claims, No Drawings

DUAL CURE METHOD USING ZEREWITINOFF-ACTIVE H TIN CATALYSTS

CROSS-REFERENCE TO RELATED APPLICATIONS

This application is a national stage application (under 35 U.S.C. § 371) of PCT/EP2018/057668, filed Mar. 26, 2018, which claims benefit of European Application No. 17162957.9, filed Mar. 27, 2017, both of which are incorporated herein by reference in their entirety.

The present invention relates to a process for producing an article made of a build material, wherein the build material comprises free-radically crosslinkable groups, NCO groups and groups having Zerewitinoff-active H atoms and the article is a three-dimensional article and/or a layer. During and/or after production of the article the build material is heated to a temperature of ≥50° C. and the build material comprises one or more special tin compounds. The invention likewise relates to an article produced by the process according to the invention and to the use of special tin compounds in additive manufacturing processes.

Coating compositions which cure by two independent processes are generally referred to as dual-cure systems. The binder components present generally have different functional groups which under suitable conditions generally undergo crosslinking with one another independently of one another. Customary prior art dual-cure systems have radiation-curable and thermally curable groups, wherein particularly advantageous properties are obtained when using isocyanate and hydroxyl groups as thermally crosslinking functions. However the disadvantage of such solutions is that the reactivity of the NCO groups and/or the presence of catalysts for the second curing mechanism limits the pot life of the coating composition.

One class of dual-cure systems contains blocked isocyanates. After a deblocking at a suitable temperature the NCO groups are available for reactions with polyols. Disadvantages of the use of blocked isocyanates are the typically high viscosity for blocked isocyanates and the typically very high deblocking temperature.

In coating applications and for use as adhesives dual-cure systems can have advantages in so-called shadow curing. This is to be understood as meaning a curing mechanism which proceeds not photochemically but rather, for example, thermally. The coating or adhesive composition can then undergo further curing even in the case of substrates having complex shapes with regions that are shaded with respect to an exposure lamp.

Several main groups of dual-cure technology are in existence in the coatings and adhesives sectors: two different free-radical starters (UV and thermal), UV and moisture post-curing, UV and PUR-2K curing and cationically catalyzed UV and thermal curing. For example Berlac AG markets a dual-cure lacquer system under the name Berlac 082.907 in which a reaction between NCO groups and OH groups is triggered first before the system is subjected to UV curing.

A further conceivable application of dual-cure systems is in additive manufacturing processes ("3D printing"). Additive manufacturing processes are processes by means of which articles are constructed in layerwise fashion. They therefore differ markedly from other processes for producing articles such as milling, drilling or material removal. In the latter processes, an article is processed such that it obtains its final geometry by removal of material.

Additive manufacturing processes utilize different materials and process techniques to effect layerwise construction of articles. One group of additive manufacturing processes uses free-radically crosslinkable resins which in some cases obtain their final strength in the formed article via a second curing mechanism. Examples of such processes are stereolithography processes and the so-called DLP process derived therefrom.

US 2016136889 A1 discloses a process for forming a three-dimensional object from a dual-care system containing a mixture of a first polymerizable liquid component and a second solidifiable component which differs from the first component. This is initially irradiated in a 3-D printing process to construct a solid intermediate containing the second solidifiable component which is borne in the scaffold in the non-solidified and/or uncured form. Simultaneously with or after the irradiation step the second component in the three-dimensional intermediate is solidified to form the three-dimensional object.

For 3-D printing the disadvantages of conventional dual-cure systems in respect of pot life mean that an unused build material is difficult to reuse and the planned construction times for a product cannot exceed the pot life.

DE 10 2009 051445 A1 discloses polyisocyanate polyaddition products obtainable from a) at least one aliphatic, cycloaliphatic, araliphatic and/or aromatic polyisocyanate b) at least one NCO-reactive compound c) at least one thermolatent inorganic tin-containing catalyst d) optionally further catalysts distinct from c) and/or activators e) optionally fillers, pigments, additives, thickeners, defoamers and/or other assistant and additive substances, wherein the ratio of the weight of the tin from component c) and of the weight of component a) is less than 3000 ppm when component a) is an aliphatic polyisocyanate and is less than 95 ppm when component a) is an aromatic polyisocyanate and wherein as thermolatent catalysts the following cyclic tin compounds are employed:

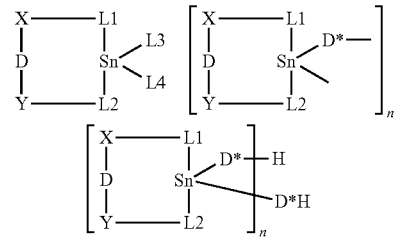

It is an object of the present invention to at least partly overcome at least one disadvantage of the prior art. It is a further object of the invention to provide a manufacturing process in which the articles to be produced from a dual-cure build material are obtainable in a very cost-efficient and/or individualized and/or resource-efficient manner, especially in terms of the reusability of build material.

The object is achieved in accordance with the invention by a process as claimed in claim 1, an article as claimed in claim 14 and a use as claimed in claim 15. Advantageous developments are specified in the subsidiary claims. They may be combined as desired unless the opposite is clear from the context.

A process for producing an article from a build material, wherein the build material comprises free-radically cross-linkable groups, NCO groups and groups having Zerewitinoff-active H atoms and the article is a three-dimensional article and/or a layer, has the feature that during and/or after production of the article the build material is heated to a temperature of ≥50° C. and that the build material comprises one or more cyclic tin compounds of formula F-I, F-II and/or F-III:

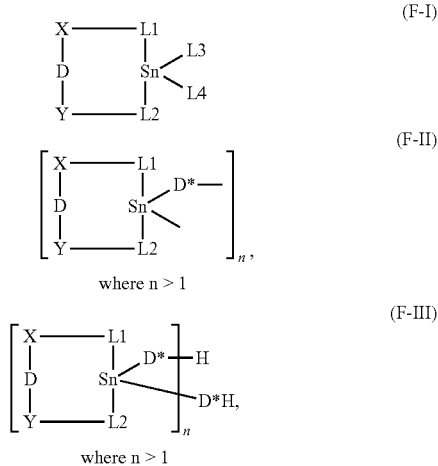

wherein:
D represents —O—, —S— or —N(R1)—
wherein R1 represents a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur, nitrogen, or is hydrogen or the radical

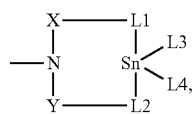

or R1 and L3 together represent —Z-L5-;
D* represents —O— or —S—;
X, Y and Z are identical or different radicals selected from alkylene radicals of formulae —C(R2)(R3)-, —C(R2)(R3)-C(R4)(R5)- or —C(R2)(R3)-C(R4)(R5)-C(R6)(R7)- or ortho-arylene radicals of formulae

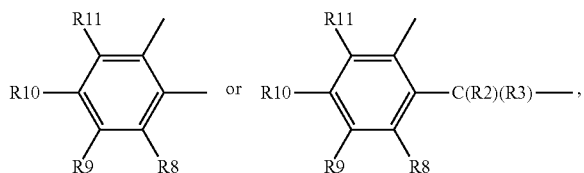

wherein R2 to R11 independently represent saturated or unsaturated, linear or branched, aliphatic or cycloaliphatic or optionally substituted aromatic or araliphatic radicals which have up to 20 carbon atoms and may optionally contain heteroatoms from the group of oxygen, sulfur, nitrogen, or are hydrogen;

L1, L2 and L5 independently represent —O—, —S—, —OC(=O)—, —OC(=S)—, —SC(=O)—, —SC(=S)—, —OS(=O)$_2$O—, —OS(=O)$_2$— or —N(R12)-,
wherein R12 represents a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur, nitrogen, or is hydrogen;

L3 and L4 independently represent —OH, —SH, —OR13, -Hal, —OC(=O)R14, —SR15, —OC(=S)R16, —OS(=O)$_2$OR17, —OS(=O)$_2$R18 or —NR19R20, or L3 and L4 together represent -L1-X-D-Y-L2-,
wherein R13 to R20 independently represent saturated or unsaturated, linear or branched, aliphatic or cycloaliphatic or optionally substituted aromatic or araliphatic radicals which have up to 20 carbon atoms and may optionally contain heteroatoms from the group of oxygen, sulfur, nitrogen, or are hydrogen.

The layer obtained by the process according to the invention may contact one or more further surfaces on one side, on both sides or on neither side. Accordingly, the layer may be a coating, an adhesive bond or a self-supporting film.

Three-dimensional articles formed by the process according to the invention may at least in sections have a height of ≥1 mm in the build direction of their production process. Thus obtained coatings and adhesive bonds may have thicknesses of ≥5 μm to ≤800 μm and thus obtained films may have thicknesses of ≥30 μm to ≤500 μm.

Below a certain temperature the tin compounds of formulae F-I, F-II and F-III exhibit no industrially useful catalytic activity tar the reaction of NCO groups with functional groups bearing Zerewitinoff-active H atoms. Such reactions include in particular urethanizations and urea formations. However, above a certain temperature the catalytic activity increases markedly. Without wishing to be bound to a particular theory it is thought that the intramolecular donor-acceptor interactions in the hypervalent tin compounds employed according to the invention or descendent products formed therefrom in the matrix are weakened at relatively high temperature so that the central atom (reversibly) blocked at relatively low-temperature is then available for the catalyzed reaction. The catalysts may therefore be referred to as thermally latent catalysts. Since the NCO groups present in the build material do not react below this temperature the build material is also easy to reuse. According to the invention activation of the Sn catalyst is achieved by heating to a temperature of ≥50° C., preferably ≥65° C., more preferably ≥80° C., particularly preferably ≥80° C. to ≤200° C., so that once reaction of the NCO groups has been effected the article is obtained. The heating can be effected for a period of ≥1 minute, preferably ≥5 minutes, more preferably ≥10 minutes to ≤24 hours, preferably ≤8 hours, particularly preferably <4 hours.

It is preferable when the catalytic activity of the thermolatent catalyst in the build material for the process according to the invention is such that the build material has a pot life (defined as the time in which the viscosity of the material doubles) at 23° C. >1 h, preferably >2 h, particularly preferably >4 h and very particularly preferably >6 h.

Especially in the cases in which the tin compounds of formulae F-I, F-II and/or F-III comprise ligands with free OH radicals and or NH radicals the catalyst can be incorporated into the product in the polyisocyanate polyaddition reaction. A particular advantage of these incorporable catalysts is their markedly reduced fogging behavior.

The different methods of production for the tin(IV) compounds for use in accordance with the invention or their tin(II) precursors are described inter alia in: *J. Organomet. Chem.* 2009 694 3184-3189, *Chem. Heterocycl. Comp.* 2007 43 813-834, *Indian J. Chem.* 1967 5 643-645 and in the literature cited therein.

The weight fraction of the tin compounds of formulae F-I, F-II and/or F-III in the build material may be made dependent on the type of isocyanates on which the build material is based. Thus, when NCO groups bonded to an aromatic C atom dominate the content may be ≤100 ppm based on the total weight of the build material. When NCO groups bonded to an aliphatic C atom dominate the content may be ≤3000 ppm based on the total weight of the build material.

Suitable sources of NCO groups in the build material include the organic aliphatic, cycloaliphatic, araliphatic and/or aromatic polyisocyanates having at least two isocyanate groups per molecule known per se to those skilled in the art and mixtures thereof. For example, it is possible to use NCO-terminated prepolymers.

Employable NCO-reactive compounds having Zerewitinoff-active H atoms include any compounds known to those skilled in the art and having an average OH or NH functionality of at least 1.5. These may be for example low molecular weight duals (for example 1,2-ethanedial, 1,3- or 1,2-propanediol, 1,4-butanediol, 1,5-pentanediol, 1,6-hexanediol), triols (for example glycerol, trimethylolpropane) and tetraols (for example pentaerythritol), short-chain amino alcohols, polyamines but also higher molecular weight polyhydroxyl compounds such as polyether polyols, polyester polyols, polycarbonate polyols, polysiloxane polyols, polyamines and polyether polyamines and polybutadiene polyols.

The build material comprises free-radically crosslinkable groups, preferably (meth)acrylate groups. They may undergo a crosslinking reaction with one another via thermal and/or via photochemical free-radical starters. Consequently the build material may also be described as a free-radically crosslinkable build material or a free-radically crosslinkable resin. It is moreover a dual-cure system according to the definition hereinabove.

It is preferable when the free-radically crosslinkable build material comprises a compound obtainable from the reaction of an NCO-terminated polyisocyanate prepolymer with a molar deficiency based on free NCO groups of a hydroxyalkyl (meth)acrylate.

It is likewise preferable when the free-radically crosslinkable build material comprises a compound obtainable from the reaction of an NCO-terminated polyisocyanurate with a molar deficiency based on free NCO groups of a hydroxyalkyl (meth)acrylate.

Suitable polyisocyanates for producing the NCO-terminated polyisocyanurates and prepolymers are for example those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1, 5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane ($H_{12}$MDI), 1.3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1, 1'-bi(cyclohexyl), 4,4'-diisocyanato-2,2',5,5'-tetramethyl-1, 1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates.

It is further possible in accordance with the invention to also employ aliphatic and/or aromatic isocyanate end group-bearing prepolymers, for example aliphatic or aromatic isocyanate end group-hearing polyether, polyester, polyacrylate, polyepoxide or polycarbonate prepolymers as reactants for the isocyanurate formation. Suitable trimerization catalysts are described hereinbelow in connection with another embodiment.

Suitable hydroxyalkyl (meth)acrylates include alkoxyalkyl (meth)acrylates having 2 to 12 carbon atoms in the hydroxyalkyl radical. Preference is given to 2-hydroxyethyl acrylate, the isomer mixture formed during addition of propylene oxide onto acrylic acid, or 4-hydroxybutyl acrylate.

The reaction between the hydroxyalkyl (meth)acrylate and the NCO-terminated polyisocyanurate may be catalyzed by the customary urethanization catalysts such as DBTL. In this reaction the molar ratio of NCO groups to OH groups of the hydroxyalkyl (meth)acrylate may be in a range from ≥10:1 to ≤1.1:1 (preferably ≥5:1 to ≤1.5:1, more preferably ≥4:1 to ≤2:1). The curable compound obtained may have a number-average molecular weight $M_n$ of ≥200 g/mol to ≤5000 g/mol. This molecular weight is preferably ≥300 g/mol to ≤4000 g/mol, more preferably ≥400 g/mol to ≤3000 g/mol.

Particular preference is given to a curable compound obtained from the reaction of an NCO-terminated polyisocyanurate with hydroxyethyl (meth)acrylate, wherein the NCO-terminated polyisocyanurate was obtained from 1,6-hexamethylene diisocyanate in the presence of an isocyanate trimerization catalyst. This curable compound has a number-average molecular weight $M_n$, of ≥400 g/mol to ≤3000 g/mol and a molar ratio of NCO groups and olefinic C=C double bonds in a range from ≥1:5 to ≤5:1, particularly preferably ≥1:3 to ≤3:1, very particularly preferably ≥1:2 to ≤2:1.

The free-radically crosslinkable build material may further comprise additives such as fillers, UV-stabilizers, free-radical inhibitors, antioxidants, mold release agents, water scavengers, slip additives, defoamers, flow agents, rheology additives, flame retardants and/or pigments. These auxiliary and additive substances, excluding fillers and flame retardants, are typically present in an amount of less than 50% by weight, preferably less than 30% by weight, particularly preferably up to 20% by weight, particularly preferably up to 10% by weight, based on the free-radically crosslinkable resin. Flame retardants are typically present in amounts of not more than 70% by weight, preferably not more than 50% by weight, particularly preferably not more than 30% by weight, calculated as the total amount of employed flame retardants based on the total weight of the free-radically crosslinkable build material.

Suitable fillet's are, for example, $AlOH_3$, $CaCO_3$, chopped glass fibers, carbon fibers, polymer fibers, metal pigments such as $TiO_2$ and further known customary fillers. These fillers are preferably used in amounts of not more than 70% by weight, preferably not more than 50% by weight, particularly preferably not more than 30% by weight, calculated as the total amount of employed fillers based on the total weight of the free-radically crosslinkable resin.

Suitable UV stabilizers may preferably be selected from the group consisting of piperidine derivatives, for example 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-l-4-piperidinyl) sebacate, bis(2,2,6,6-tetramethyl-4-piperidyl) suberate, bis(2,2,6,6-tetramethyl-4-piperidyl) dodecanedioate; benzophenone derivatives, for example 2,4-dihydroxy-, 2-hydroxy-4-methoxy-, 2-hydroxy-4-octoxy-, 2-hydroxy-4-dodecyloxy- or 2,2'-dihydroxy-4-dodecyloxybenzophenone; benzotriazole derivatives, for example 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl)phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides, for example 2-ethyl-2'-ethoxy- or 4-methyl-4'-methoxyoxalanilide; salicylic esters, for example phenyl salicylate, 4-tert-butylphenyl salicylate, 4-tert-octylphenyl salicylate; cinnamic ester derivatives, for example methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4-butoxybenzylidenemalonate. These preferred light stabilizers may be used either individually or in any desired combinations with one another.

Particularly preferred UV stabilizers are those which completely absorb radiation having a wavelength <400 nm. These include the recited benzotriazole derivatives for example. Very particularly preferred UV stabilizers am 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol and/or 2-(5-chloro-2H-benzotriazol-2-yl)-4,6-bis(1,1-dimethylethyl)phenol.

One or more of the UV stabilizers recited by way of example are optionally added to the free-radically crosslinkable build material preferably in amounts of 0.001 to 3.0% by weight, particularly preferably 0.005 to 2% by weight, calculated as the total amount of employed UV stabilizers based on the total weight of the free-radically crosslinkable build material.

Suitable antioxidants are preferably sterically hindered phenols which may be selected preferably from the group consisting of 2,6-di-tert-butyl-4-methylphenol (ionol), pentaerythritol tetrakis(3-(3,5-di-tert-butyl-4-hydroxyphenyl) propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. These may be used either individually or in any desired combinations with one another as required. These antioxidants are preferably used in amounts of 0.01% to 3.0% by weight, particularly preferably 0.02% to 2.0% by weight, calculated as the total amount of employed antioxidants based on the total weight of the free-radically crosslinkable build material.

Suitable free-radical inhibitors/retarders are particularly those which specifically inhibit uncontrolled free-radical polymerization of the resin formulation outside the desired (irradiated) region. These are crucial for good contour sharpness and imaging accuracy in the precursor. Suitable free-radical inhibitors must be chosen according to the desired free-radical yield from the irradiation/exposure step and the polymerization rate and reactivity/selectivity of the double bond carrier. Suitable free-radical inhibitors are, for example, 2,2-(2,5-thiophenediyl)bis(5-tert-butylbenzoxazole), phenothiazine, hydroquinones, hydroquinone ether, quinone alkyds and nitroxyl compounds and mixtures thereof, benzoquinones, copper salts, catechols, cresols, nitrobenzene and oxygen. These antioxidants are preferably used in amounts of 0.001% by weight to 3% by weight.

It is preferable when the molar concentration of Zerewitinoff-active H atoms relative to free isocyanates is ≥0.6 and ≤1.5, preferably ≥0.8 and ≤1.4, particularly preferably ≥0.9 and ≤1.3, and very particularly preferably ≥1 and ≤1.2.

In a preferred embodiment the article is a three-dimensional article, the article is obtained from a precursor and the process comprises the steps of:
I) depositing free-radically crosslinked build material atop a carrier to obtain a ply of a build material joined to the carrier which corresponds to a first selected cross section of the precursor;
II) depositing free-radically crosslinked build material atop a previously applied ply of the build material to obtain a further ply of the build material which corresponds to a further selected cross section of the precursor and which is joined to the previously applied ply;
III) repeating step II) until the precursor is formed;
wherein the depositing of free-radically crosslinked build material at least in step II) is effected by exposure and/or irradiation of a selected region of a free-radically crosslinkable build material corresponding to the respectively selected cross section of the precursor and
wherein the free-radically crosslinkable build material has a viscosity (23° C., DIN EN ISO 2884-1) of ≥5 mPas to ≤1 000 000 mPas,
wherein the free-radically crosslinkable build material comprises a curable component comprising NCO groups and olefinic C═C double bonds,
and step III) is followed by a further step IV):
IV) heating the precursor obtained after step III) to a temperature of ≤50° C. to obtain the article.

In this variant the article is thus obtained using an additive production process and in two production phases. The first production phase can be regarded as the build or construction phase. This build phase can be implemented by means of particle optics-based additive manufacturing processes such as the inkjet process, stereolithography or the DLP (digital light processing) process and is represented by steps I), II) and III). The second production phase may be regarded as a curing phase and forms the subject matter of step IV). Here, the precursor or intermediate object obtained after the construction phase is converted into a more mechanically durable object, without further changing the shape thereof.

Step I) of this variant of the process comprises depositing a free-radically crosslinked build material atop a carrier. This is usually the first step in inkjet, stereolithography and DLP processes. In this way a ply of a build material joined to the carrier which corresponds to a first selected cross section of the precursor is obtained.

As per the instruction of step III), step II) is repeated until the desired precursor is formed. Step II) comprises depositing a free-radically crosslinked build material atop a previously applied ply of the build material to obtain a further ply of the build material which corresponds to a further selected cross section of the precursor and which is joined to the previously applied ply. The previously applied ply of the build material may be the first ply from step I) or a ply from a previous run of step II).

It is provided in this process variant that the depositing of a free-radically crosslinked build material at least in step II) (preferably also in step I) is effected by exposure and/or irradiation of a selected region of a free-radically crosslinkable resin corresponding to the respectively selected cross section of the object. This can be achieved either by selective exposure (stereolithography, DLP) of the crosslinkable build material or by selective application of the crosslinkable build material followed by an exposure step which, on account of the preceding selective application of the crosslinkable build material, need no longer be selective (inkjet process).

The terms "free-radically crosslinkable build material" and "free-radically crosslinked build material" are used in the context of the present invention. The free-radically crosslinkable build material is converted into the free-radically crosslinked build material by the exposure and/or irradiation which triggers free-radical crosslinking reactions. "Exposure" is to be understood in the present context as meaning the action of light in the range between near-IR and near-UV light (wavelengths of 1400 nm to 315 nm). The remaining shorter wavelength ranges are covered by the term "irradiation", for example far UV light, x-ray radiation, gamma radiation and also electron radiation.

The selecting of the respective cross section is advantageously effected by means of a CAD program, with which a model of the object to be produced has been generated. This operation is also known as "slicing" and serves as a basis for controlling the exposure and/or irradiation of the free-radically crosslinkable resin.

In this process variant the free-radically crosslinkable build material has a viscosity (23° C., DIN EN ISO 2884-1) of ≥5 mPas to ≤1 000 000 mPas. It should thus be regarded as a liquid resin at least for the purposes of additive manufacturing. The viscosity is preferably ≥50 mPas to ≤100000 mPas, more preferably ≥500 mPas to ≤50 000 mPas.

In the process the free-radically crosslinkable resin further comprises a curable component comprising NCO groups and olefinic C═C double bonds. In this curable component the molar ratio of NCO groups to olefinic C═C double bonds may be in a range from ≥1:5 to ≤5:1 (preferably ≥1:4 to ≤4:1, more preferably ≥1:3 to ≤3:1). The molecular ratio of these functional groups may be determined in the $^{13}C$ NMR spectrum by integration of the signals of a sample.

In addition to the curable component the free-radically crosslinkable build material may also comprise a non-curable component in which for example stabilizers, fillers and the like are combined. In the curable component, the NCO groups and the olefinic C═C double bonds may be present in separate molecules and/or in a common molecule. When NCO groups and olefinic C═C double bonds are present in separate molecules the body obtained after step IV) of this process variant may have an interpenetrating polymer network.

In this variant of the process step III) is further followed by further step IV). This step comprises the heating of the precursor obtained after step III) to a temperature of ≥50° C., preferably ≥65° C., more preferably ≥80° C., particularly preferably ≥80° C. to ≤200° C., to obtain the article. The heating can be effected for a period of ≥1 minute, preferably ≥5 minutes, more preferably ≥10 minutes to ≤24 hours, preferably ≤8 hours, particularly preferably <4 hours.

The reaction is preferably performed until ≤30%, preferably ≤20% and more preferably ≤15% of the NCO groups originally present are still present. This may be determined by quantitative IR spectroscopy.

Step IV) is preferably performed only when the entirety of the build material of the precursor has reached its gel point. The gel point is considered to have been reached when in a dynamic-mechanical analysis (DMA) with a plate/plate oscillation viscometer in accordance with ISO 6721-10 at 20° C. the graphs of the storage modulus G' and the loss modulus G" intersect. The precursor is optionally subjected to further exposure and/or radiation to complete free-radical crosslinking. The free-radically crosslinked build material may have a storage modulus G' (DMA, plate/plate oscillation viscometer according to ISO 6721-10 at 20° C. and a shear rate of 1/s) of ≥10$^6$ Pa.

In a further preferred embodiment the process has the following features:
    the carrier is arranged inside a container and is vertically lowerable in the direction of the gravitational force,
    the container contains the free-radically crosslinkable build material in an amount sufficient to cover at least the carrier and an uppermost surface of crosslinked build material deposited on the carrier as viewed in the vertical direction,
    before each step II) the carrier is lowered by a predetermined distance so that above the uppermost ply of the crosslinked build material viewed in the vertical direction a layer of the free-radically crosslinkable build material is formed and
    in step II) an energy beam exposes and/or irradiates the selected region of the layer of the free-radically crosslinkable build material corresponding to the respectively selected cross section of the precursor.

Accordingly, this embodiment covers the additive manufacturing process of stereolithography (SLA). The earlier may for example be lowered by a predetermined distance of 1 μm to 2000 μm in each case.

In a further preferred embodiment the process has the following features:
    the carrier is arranged inside a container and is vertically raisable counter to the direction of the gravitational force,
    the container provides the free-radically crosslinkable build material,
    before each step II) the carrier is raised by a predetermined distance so that below the lowermost ply of the crosslinked build material viewed in the vertical direction a layer of the free-radically crosslinkable build material is formed and
    in step II) a plurality of energy beams simultaneously exposes and/or irradiates the selected region of the layer of the free-radically crosslinkable build material corresponding to the respectively selected cross section of the precursor.

Accordingly, this embodiment covers the additive manufacturing process of DLP technology when the plurality of energy beams generate the image to be provided by exposure and/or irradiation via an array of individually controllable micromirrors. The carrier may for example be raised by a predetermined distance of ≥1 μm to ≤2000 μm in each case.

In a further preferred embodiment the process has the following features:
in step II) the free-radically crosslinkable build material is applied from one or more printing heads corresponding to the respectively selected cross section of the precursor and is subsequently exposed and/or irradiated.

Accordingly, this embodiment covers the additive manufacturing process of the inkjet method: the crosslinkable build material optionally separately from catalysts according to the invention is applied selectively via one or more printing heads and the subsequent curing by irradiation and/or exposure may be nonselective, for example via a UV lamp. The one or more printing heads for application of the crosslinkable build material may be a (modified) printing head for inkjet printing processes. The carrier may be configured to be movable away from the printing head or the printing head may be configured to be movable away from the carrier. The increments of the spacing movements between the carrier and the printing head may be in a range from ≥1 μm to ≤2000 μm for example In a further preferred embodiment the article is a coating and the process comprises the steps of:
applying the build material atop a substrate
heating and/or UV-irradiating the applied build material to effect in the applied build material an at least partial crosslinking of the free-radically crosslinkable groups
heating the applied build material to a temperature of ≥50° C. to effect in the applied build material at least in part a reaction between NCO groups and groups having Zerewitinoff-active H atoms.

The heating can result for example in thermal decomposition of peroxide-based free-radical starters. The UV-irradiation is effected using UV light (1400 nm to 315 nm wavelength) and activates photochemical free-radical starters. In a further step the latent Sn urethanization catalyst is activated to trigger the second curing mechanism.

In a further preferred embodiment the article is an adhesive bond and the process comprises the steps of:
applying the build material atop a first substrate
contacting the applied build material with a second substrate
heating and/or UV-irradiating the applied build material to effect in the applied build material an at least partial crosslinking of the free-radically crosslinkable groups
heating the applied build material to a temperature of ≤50° C. to effect in the applied build material at least in part a reaction between NCO groups and groups having Zerewitinoff-active H atoms.

The heating can result for example in thermal decomposition of peroxide-based free-radical starters. The UV-irradiation is effected using UV light (1400 nm to 315 nm wavelength) and activates photochemical free-radical starters. In a further step the latent Sn urethanization catalyst is activated to trigger the second curing mechanism.

In a further preferred embodiment the build material further comprises a free-radical starter and/or an isocyanate trimerization catalyst. To prevent an undesired increase in the viscosity of the free-radically crosslinkable build material the free-radical initiator and/or the isocyanate trimerization catalyst may be added to the build material only immediately before commencement of the process according to the invention.

Contemplated free-radical starters include thermal and/or photochetnical free-radical starters (photoinitiators). It is also possible to use thermal and photochemical free-radical starters simultaneously. Suitable thermal free-radical starters are for example (AIBN), dibenzoyl peroxide (DBPO), di-tert-butyl peroxide, dicumyl peroxide and/or inorganic peroxides such as peroxodisulfates.

Photoinitiators are in principle distinguished into two types, the unimolecular type (1) and the bimolecular type (TI). Suitable type (1) systems are aromatic ketone compounds, for example benzophenones in combination with tertiary amines, alkylbenzophenones, 4,4'-bis(dimethylamino)benzophenone (Michler's ketone), anthrone and halogenated benzophenones or mixtures of the recited types. Also suitable are type (II) initiators such as benzoin and derivatives thereof, benzil ketals, acylphosphine oxides, 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones. Specific examples are Irgacure®500 (a mixture of benzophenone and (1-hydroxycyclohexyl) phenyl ketone, from Ciba, Lampertheim, DE), Irgacure®819 DW (phenylbis(2,4,6-trimethylbenzoyl)phosphine oxide, from Ciba, Lampertheim, Del.) or Esacure® KIP EM (oligo-[2-hydroxy-2-methyl-1-[4-(1-methylvinyl) phenyl]propanones], from Lamberti, Aldizzate, Italy) and bis(4-methoxybenzoyl)diethylgermanium. Mixtures of these compounds may also be employed.

It should be ensured that the photoinitiators have a sufficient reactivity toward the radiation source used. Numerous photoinitiators are known on the market. Commercially available photoinitiators cover the wavelength range of the entire UV-VIS spectrum. Photoinitiators find use in the production of paints, printing inks and adhesives and also in the dental sector.

In this process variant, the photoinitiator is generally used in a concentration, based on the amount of the curable olefinically unsaturated component bearing double bonds used, of 0.01% to 6.0% by weight, preferably of 0.05% to 4.0% by weight and more preferably of 0.1% to 3.0% by weight.

In a further preferred embodiment the build material is obtained by mixing an NCO-group-containing component and a component containing groups having Zerewitinoff-active H atoms and the mixing is effected ≤5 minutes before commencement of the process. In processes such as DLP processes it is further preferred when the mixture of the build material is produced continuously and supplied to the construction process. To avoid undesired side reactions the remaining constituents of the build material may be present in the component containing Zerewitinoff-active H atoms.

A further preferred embodiment provides that in the definition according to the foregoing D is —N(R1)- and R1 is hydrogen or an alkyl, aralkyl, alkaryl or aryl radical having up to 20 carbon atoms or the radical

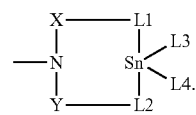

A further preferred embodiment provides that in the definition according to the foregoing R1 is hydrogen or a methyl, ethyl, propyl, butyl, hexyl, octyl, Ph, or CH$_3$Ph radical or the radical

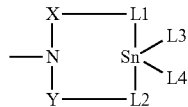

and propyl, butyl, hexyl and octyl represent all isomeric propyl, butyl, hexyl and octyl radicals.

A further preferred embodiment provides that in the definition according to the foregoing D* is —O—, Further preferred features for the tin compounds according to the foregoing are as follows:

X, Y and Z are preferably the alkenylene radicals —C(R2)(R3)-, —C(R2)(R3)-C(R4)(R5)- or the ortho-arylene radical

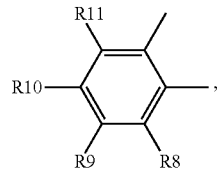

R2 to R7 are preferably hydrogen or alkyl, aralkyl, alkaryl or aryl radicals having up to 20 carbon atoms, particularly preferably hydrogen or alkyl, aralkyl, alkaryl or aryl radicals having up to 8 carbon atoms, very particularly preferably hydrogen or alkyl radicals having up to 8 carbon atoms, yet more preferably hydrogen or methyl.

R8 to R11 are preferably hydrogen or aryl radicals having up to 8 carbon atoms, particularly preferably hydrogen or methyl.

L1, L2 and L5 are preferably —NR12-, —S—, —SC(=S)—, —SC(=O)—, —OC(=S)—, —O—, or —OC(=O)—, particularly preferably —O—, or —OC(=O)—.

R12 is preferably hydrogen or an alkyl, aralkyl, alkaryl or aryl radical having up to 20 carbon atoms, particularly preferably hydrogen or an alkyl, aralkyl, alkaryl or aryl radical having up to 12 carbon atoms, very particularly preferably hydrogen or a methyl, ethyl, propyl, butyl, hexyl or octyl radical, where propyl, butyl, hexyl and octyl represent all isomeric propyl, butyl, hexyl and octyl radicals.

L3 and L4 are preferably —Hal, —OH, —SH, —OR13, —OC(=O)R14, where the R13 and R14 radicals have up to 20 carbon atoms, preferably up to 12 carbon atoms.

L3 and L4 are particularly preferably Cl—, MeO—, EtO—, PrO—, BuO—, HexO—, OctO—, PhO—, formate, acetate, propanoate, butanoate, pentanoate, hexanoate, octanoate, laurate, lactate or benzoate, where Pr, Bu, Hex and Oct are all isomeric propyl, butyl, hexyl and octyl radicals, yet more preferably Cl—, MeO—, EtO—, BuG—, flexO—, OetO—, PhO—, hexanoate, laurate or benzoate, where Pr, Bu, Hex and Oct represent all isomeric propyl, butyl, hexyl and octyl radicals.

R15 to R20 are preferably hydrogen or alkyl, aralkyl, alkaryl or aryl radicals having up to 20 carbon atoms, particularly preferably hydrogen or alkyl, aralkyl, alkaryl or aryl radicals having up to 12 carbon atoms, very particularly preferably hydrogen, methyl, ethyl, propyl, butyl, hexyl or octyl radicals, where propyl, butyl, hexyl and octyl represent all isomeric propyl, butyl, hexyl and octyl radicals.

The units L1-X, L2-Y and L5-Z preferably represent —CH$_2$CH$_2$O—, —CH$_2$CH(Me)O—, —CH(Me)CH$_2$O—, —CH$_2$C(Me)$_2$O—, —C(Me)$_2$, CH$_2$O— or —CH$_2$C(=O)O—.

The unit L1-X-D-Y-L2 preferably represents: HN[CH$_2$CH$_2$O—]$_2$, HN[CH$_2$CH(Me)O—]$_2$, HN[CH$_2$CH(Me)O—][CH(Me)CH$_2$O—], HN[CH$_2$C(Me)$_2$O—]$_2$, HN[CH$_2$C(Me)$_2$O—][C(Me)$_2$CH$_2$O—], HN[CH$_2$C(=O)O—]$_2$, MeN[CH$_2$CH$_2$O—]$_2$, MeN[CH$_2$CH(Me)O—]$_2$, MeN[CH$_2$CH(Me)O—][CH(Me)CH$_2$O—], MeN[CH$_2$C(Me)$_2$O—]$_2$, MeN[CH$_2$C(Me)$_2$O—][C(Me)$_2$CH$_2$O—], MeN[CH$_2$C(=O)O—]$_2$, EtN[CH$_2$CH$_2$O—]$_2$, EtN[CH$_2$CH(Me)O—]$_2$, EtN[CH$_2$CH(Me)O—][CH(Me)CH$_2$O—], EtN[CH$_2$C(Me)$_2$O—]$_2$, EtN[CH$_2$C(Me)$_2$O—][C(Me)$_2$CH$_2$O—], EtN[CH$_2$C(=O)O—]$_2$, PrN[CH$_2$CH$_2$O-]$_2$, PrN[CH$_2$CH(Me)O—]$_2$, PrN[CH$_2$CH(Me)O—][CH(Me)CH$_2$O—], PrN[CH$_2$C(Me)$_2$O—]$_2$. PrN[CH$_2$C(Me)$_2$O—][C(Me)$_2$CH$_2$O—], PrN[CH$_2$C(=O)O—]$_2$, BuN[CH$_2$CH$_2$O-]$_2$, BuN[CH$_2$CH(Me)O—]$_2$, BuN[CH$_2$CH$_1$(Me)O—][CH(Me)CH$_2$O—], BuN[CH$_2$C(Me)$_2$O—]$_2$. BuN[CH$_2$C(Me)$_2$O—][C(Me)$_2$CH$_2$O—], BuN[CH$_2$C(=O)O—]$_2$, HexN[CH$_2$CH$_2$O—]$_2$, HexN[CH$_2$CH(Me)O—]$_2$, HexN[CH$_2$CH(Me)O—][CH(Me)CH$_2$O—], HexN[CH$_2$C(Me)$_2$O—]$_2$. HexN[CH$_2$C(Me)$_2$O—][C(Me)$_2$CH$_2$O ], HexN[CH$_2$C(=O)O—]$_2$, OctN[CH$_2$CH$_2$O—]$_2$, OctN[CH$_2$CH(Me)O—]$_2$, OctN[CH$_2$CH(Me)O—][CH(Me)CH$_2$O—], OctN[CH$_2$C(Me)$_2$O—]$_2$. OctN[CH$_2$C(Me)$_2$O—][C(Me)$_2$CH$_2$O—], OctN[CH$_2$C(=O)O—]$_2$, wherein Pr, Bu, Hex and Oct may represent all isomeric propyl, butyl and octyl radicals, PhN[CH$_2$CH$_2$O—]$_2$, PhN[CH$_2$CH(Me)O—]$_2$, PhN[CH$_2$CH(Me)O—][CH(Me)CH$_2$O—], PhN[CH$_2$C(Me)$_2$ O—]$_2$. PhN[CH$_2$C(Me)$_2$O—][C(Me)$_2$CH$_2$O—], PhN[CH$_2$C(=O)O—]$_2$,

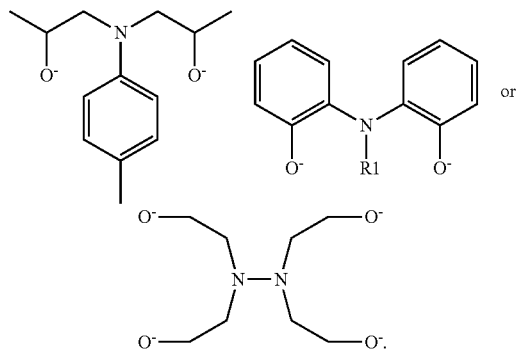

As is known to a person skilled in the art the tin compounds have a propensity for oligomerisation and polynuclear tin compounds or mixtures of mono- and polynuclear tin compounds are therefore often present. In the polynuclear tin compounds the tin atoms are preferably connected to one another via oxygen atoms ('oxygen bridges', vide intra). Typical oligomeric complexes (polynuclear tin compounds) form, for example, through condensation of the tin atoms via oxygen or sulfur, for example

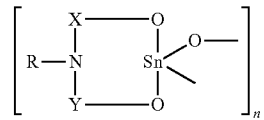

where n>1 (cf. formula F-II). Cyclic oligomers are frequently encountered in the case of low degrees of oligomerization, linear oligomers with OH or SH end groups in the case of higher degrees of oligomerization (cf formula F-III).

In a further preferred embodiment the cyclic tin compound is selected from the group of mono- or polynuclear tin compounds of the type:

1,1-di-"R"-5-"organyl"-5-aza-2,8-dioxa-l-stannacyclooctanes, 1,1-di-"R"-5-(N-"organyl")aza-3,7-di-"organyl"-2,8-dioxa-1-stannacyclooctanes, 1,1-di-"R"-5-(N-"organyl")aza-3,3,7,7-tetra-"organyl"-2,8-dioxa-1-stannacyclooctanes, 4,12-di-"organyl"-1,7,9,15-tetraoxa-4,12-diaza-8-stannaspiro[7.7]pentadecane, 4,12-di-"organyl"-2,6,10,14-tetra-"organyl"-1,7,9,15-tetraoxa-4,12-diaza-8-stannaspiro[7.7]pentadecane, 4,12-di-"organyl"-2,2,6,6,10,10,14,14-octa-"organyl"-1,7, 9,15-tetraoxa-4,12-diaza-8-stannaspiro[7.7]pentadecane, wherein "R" is D*, L3 or L4, as defined above, and "organyl" is R1, as defined above.

A further preferred embodiment provided that as the cyclic tin compound one or more of the following compounds is employed:

4,12-di-n-butyl-1,7,9,15-tetraoxa-4,12-diaza-8-stannaspiro [7.7]pentadecane, 4,12-di-n-butyl-2,6,10,14-tetramethyl-1,7,9,15-tetraoxa-4, 12-diaza-8-stannaspiro[7.7]pentadecane, 2,4,6,10,12,14-hexamethyl-1,7,9,15-tetraoxa-4,12-diaza-8-stannaspiro[7.7]pentadecane, 4,12-di-n-octyl-2,6,10,14-tetramethyl-1,7,9,15-tetraoxa-4, 12-diaza-8-stannaspiro[7.7]pentadecane, 4,12-di-n-octyl-1,7,9,15-tetraoxa-4,12-diaza-8-stannaspiro [7.7]pentadecane, 4,12-dimethyl-1,7,9,15-tetraoxa-4,12-diaza-8-stannaspiro [7.7]pentadecane, 1,1-dichloro-5-methyl-5-aza-2,8-dioxa-1-stannacyclooctane, 1,1-diisopropyl-5-methyl-5-aza-2,8-dioxa-1-stannacyclooctane, 1,1-dibenzoyl-3,3,7,7-tetramethyl 5-n-octyl-5-aza-2,8-dioxa-1-stannacyclooctane, 1,1-dibenzoyl-5-n-octyl-5-aza-2,8-dioxa-l-stannacyclooctane, 1,1-bis(p-dodecylphenylsulfonyl)-5-n-octyl-5-aza-2,8-dioxa-1-stannacyclooctane, 2-benzoyloxy-6-octyl-4,8-dioxo-1,3,6,2-dioxazastannocan-2-y benzoate or mixtures thereof.

Also preferably employed as cyclic tin compounds are at least one or a mixture of at least two of the following compounds:

4,12-bis(cyclopentyl)-1,7,9,15-tetraoxa-4,12-diaza-8-stannaspirol[7.7]pentadecane, 4,12-bis(cyclohexyl)-1,7,9,15-tetraoxa-4,12-diaza-8-stannaspiro[7.7]pentadecane, 4,12-bis(cyclopentyl)-2,6,10,14-tetramethyl-1,7,9,15-tetraoxa-4,12-diaza-8-stannaspirol[7.7]pentadecane, 4,12-bis(cyclohexyl)-2,6,10,14-tetramethyl-1,7,9,15-tetraoxa-4,12-diaza-8-stannaspirol[7.7]pentadecane, 4,12-dibutyl-2,6,10,14-tetramethyl-1,7,9,15-tetraoxa-4,12-diaza-8-stannaspirol[7.7]pentadecane.

The build material in the process according to the invention may for example have the following composition, wherein all reported amounts are in percent by weight and the quantities in percent by weight sum to ≤100% by weight.

| | |
|---|---|
| NCO-functional urethane acrylate | 20-30 |
| Acrylate | 35-45 |
| Polyol | 30-40 |
| Photoinitiator 1 | 0.1-0.3 |
| Photoinitiator 2 | 0.1-0.3 |
| UV inhibitor | 0.01-0.3 |
| Sn cat | 0.01-0.2 |

Specifically:

| | |
|---|---|
| NCO-functional urethane acrylate | 25.4 |
| Acrylate | 39.5 |
| Polyol | 34.3 |
| Photoinitiator 1 | 0.22 |
| Photoinitiator 2 | 0.22 |
| UV inhibitor | 0.2 |
| Sn cat | 0.034-0.102 |

NCO-functional urethane acrylate: for example a urethane acrylate obtainable from the reaction of trimeric HDI isocyanurate with hydroxypropyl acrylate at an NCO index of 200 by stirring at 60° C. until all OH groups are converted.

Acrylate: for example isobornyl acrylate

Polyol: for example a polyether polyol such as polytetramethylene ether glycol having a molecular mass of 1000 g/mol (PolyTHF 1000)

Photoinitiator 1: Acyiphosphine oxide, for example ethyl (2,4,6-trimethylbenzoyl)phenylphosphinate (TPOL)

Photoinitiator 2: Germanium-based photoinitiator such as for example bis-4-(methoxybenzoyDdiethylgerinanium UV inhibitor: for example Mayzo OB+ (2,2'-(2,5-thiophenediyl)bis(5-tertbutylbenzoxazole))

Sn cat: cyclic tin compound of formula F-I, F-II or F-III

The present invention further provides for an article obtained by a process according to the invention, wherein in the build direction of its production process at least in sections the article has a height of ≥1 mm, preferably ≥5 mm.

The invention likewise relates to the use of cyclic tin compounds of formula F-I, F-II and/or F-III as defined in the foregoing as thermally latent urethartization catalysts in build materials for additive manufacturing processes.

Experimental Part

The invention is more particularly elucidated with reference to the examples below but is not limited thereto.

The formulations of build materials, specified in table 1, containing free-radically crosslinkable groups, NCO groups and groups having Zerewitinoff-active H atoms were produced. The quantities reported in table 1 relate to weight fractions.

INVENTIVE EXAMPLE 1

Build material containing Desmodus® N3390 BA, hydroxyethyl acrylate and 4,12-bis(cyclopentyl)-1,7,9,15-tetraoxa-4,12-diaza-8-stannaspirol[7.7]pentadecane (polyisocyanate with thermolatent catalyst)

INVENTIVE EXAMPLE 2

Build material containing Desmodur® N3390 BA, hydroxyethyl acrylate and 4,12-bis(cyclohexyl)-1,7,9,15-tetraoxa-4,12-diaza-8-stannaspirol[7.7]pentadecane (polyisocyanate with thermolatent catalyst)

INVENTIVE EXAMPLE 3

Build material containing Desmodure N3390 BA, hydroxyethyl acrylate and 4,12-bis(cyclopentyl)-2,6,10,14-tetramethyl-1,7,9,15-tetraoxa-4,12-diaza-8-stannaspirol[7.7]pentadecane (polyisocyanate with thermolatent catalyst)

INVENTIVE EXAMPLE 4

Build material containing Desmodur® N3390 BA, hydroxyethyl acrylate and 4,12-bis(cyclohexyl)-2,6,10,14-tetramethyl-1,7,9,15-tetraoxa-4,12-diaza-8-stannaspirol[7.7]pentadecane (polyisocyanate with thermolatent catalyst)

INVENTIVE EXAMPLE 5

Build material containing Desmodur® N3390 BA, hydroxyethyl acrylate and 4,12-dibutyl-2,6,10,14-tetramethyl-1,7,9,15-tetraoxa-4,12-diaza-8-stannaspirol[7.7]pentadecane (polyisocyanate with thermolatent catalyst)

INVENTIVE EXAMPLE 6

Build material containing Desmodur® N 3390 BA, hydroxyethyl acrylate and dibutyltin dilaurate (DBTL) 400 ppm.

INVENTIVE EXAMPLE 7

Build material containing Desmodur® N 3390 BA, hydroxyethyl acrylate and dibutyltin dilaurate (DBTL) 40 ppm

INVENTIVE EXAMPLE 8

Build material containing Desmodur® N 3390 BA, hydroxyethyl acrylate without catalyst Desmodur® N 3390 BA is a commercially available product from Covestro AG. The material data for Desmodur® N 3390 BA corresponds to the information reported on the datasheet of the same name dated 2017-06-01. This material is an aliphatic polyisocyanate (HDI trimer), about 90% by weight in n-butyl acetate, used inter alia as a curing agent component for lightfast polyurethane lacquer systems. The NCO content is about 19.6% by weight (determined according to DIN EN ISO 11 909), viscosity at 23° C. 500+/−150 mPa·s (determined according to DIN EN ISO 3219/A.3).

TABLE 1

Composition of build materials

| Input material | 1 | 2 | 3 | 4 | 5 | CE 6 | CE 7 | CE 8 |
|---|---|---|---|---|---|---|---|---|
| | | | | Parts by weight [%] | | | | |
| Desmodur ® N 3390 | 62.93 | 62.92 | 62.91 | 62.90 | 62.92 | 63.06 | 63.096 | 63.10 |
| 4,12-Bis(cyclopentyl)-1,7,9,15-tetraoxa-4,12-diaza-8-stannaspirol[7.7]pentadecane | 0.17 | — | — | — | — | — | — | — |
| 4,12-Bis(cyclohexyl)-1,7,9,15-tetraoxa-4,12-diaza-8-stannaspirol[7.7]pentadecane | — | 0.18 | — | — | — | — | — | — |
| 4,12-Bis(cyclopentyl)-2,6,10,14-tetramethyl-1,7,9,15-tetraoxa-4,12-diaza-8-stannaspirol[7.7]pentadecane | — | — | 0.19 | — | — | — | — | — |
| 4,12-Bis(cyclohexyl)-2,6,10,14-tetramethyl-1,7,9,15-tetraoxa-4,12-diaza-8-stannaspirol[7.7]pentadecane | — | — | — | 0.20 | — | — | — | — |
| 4,12-Dibutyl-2,6,10,14-tetramethyl-1,7,9,15-tetraoxa-4,12-diaza-8-stannaspirol[7.7]pentadecane | — | — | — | — | 0.18 | — | — | — |
| Dibutyltin dilaurate (DBTL) | — | — | — | — | — | 0.04 | 0.004 | — |
| Hydroxyethyl acrylate | 34.00 | 34.00 | 34.00 | 34.00 | 34.00 | 34.00 | 34.00 | 34.00 |
| 2-Hydroxy-2-methyl-1-phenylpropan-1-one | 2.90 | 2.90 | 2.90 | 2.90 | 2.90 | 2.90 | 2.90 | 2.90 |

Formulation of the Build Materials

The components were weighed into a plastic beaker with a lid in the sequence isocyanate (Desmodur® N 3390 BA), catalyst (if employed), hydroxyacrylate and photoinitiator (2-hydroxy-2-methyl-1-phenyl-propan-1-one Omnirad®

1173 from IGM Resins). These input materials were mixed in a Thinky ARE250 planetary mixer at a speed of 2000 revolutions per minute at room temperature for about 2 minutes. All formulations had a stoichiometric ratio of NCO groups to OH groups of about 1:1.

Viscosity Measurement Over Reaction Time

The first viscosity measurement was carried out immediately, i.e. within 2 minutes after the 2 minutes of mixing. Further viscosity measurements were subsequently performed at intervals as shown in table 2. All viscosity measurements reported in table 2 were performed with an Anton Poor MCR 51 viscometer with a CP25-2 cone-plate measuring system at 23° C.

TABLE 2

Viscosity at 23° C. after different reaction times

| Time [minutes] | Example |  |  |  |  | CE 6 | CE 7 | CE 8 |
|---|---|---|---|---|---|---|---|---|
|  | 1 | 2 | 3 | 4 | 5 |  |  |  |
|  | Viscosity [mPas] |  |  |  |  |  |  |  |
| 0 | 70 | 70 | 77 | 85 | 78 | 63 500 | 55 | 67 |
| 15 | n.d.* | n.d. | n.d. | n.d. | 93 | 70 600 | 66 | 150 |
| 30 | 62 | 88 | 80 | 107 | 102 | polymerized | 330 | 66 |
| 60 | 106 | 106 | 113 | 146 | 139 | — | 1700 | 66 |
| 120 | 148 | 146 | 159 | 221 | 222 | — | 5700 | 67 |
| 240 | 323 | 304 | 327 | 563 | 559 | — | 15 000 | 67 |
| 1440 | 30 100 | 29 100 | 43 400 | 63 000 | 70 000 | — | polymerized | 116 |

*n.d.: not determined

The inventive examples 1 to 5 showed a doubling of the initial viscosity determined at a time of 0 minutes only after a period of >60 Minutes (pot life).

The comparative example CE 6 containing 400 ppm of DBTL showed a viscosity of 63 000 mPas immediately after mixing and had polymerized after 30 minutes so that a viscosity determination was no longer possible.

Comparative example CE 7 containing 40 ppm of DBTL already showed a doubling of the viscosity determined at 0 minutes after less than 30 minutes (pot life).

The comparative example CE 8 without catalyst showed virtually no change in viscosity over 240 minutes.

Film Production and Infrared Measurement of NCO Bands:

The free-radically curable build materials according to inventive examples 1 to 5 and comparative examples CE 6 to CE 8 were applied to a glass sheet using a knife coater having a 400 µm slot.

The coated glass substrates were subsequently cured with mercury and gallium radiation sources in a Superfici UV curing line at a belt speed of 5 m/min. The lamp output and belt speed result in a radiation intensity of 1300 mJ/cm$^2$ being introduced to the coated substrates.

The UV-cured films on the glass substrates were subsequently aged in an air atmosphere at 150° C. in a drying oven and withdrawn from the oven for the respective IR measurement at the times reported in table 3. After measurement the samples were returned to the oven.

Measurement of free NCO groups was performed using an FTIR spectrometer (Tensor II) from Bruker. The specimen film was contacted with the platinum. ATR unit. The contacted area of the sample was 2×2 mm. During measurement the IR radiation penetrated 3 to 4 µm into the sample depending on wavenumber. An absorption spectrum was then obtained from the sample. In order to compensate for a nonuniform contacting of the samples of different hardnesses a baseline correction and a normalization in the wavenumber range from 2600 to 3200 (CH2, CH3) was performed on all spectra. Integration of the signal for the NCO groups (referred to as "integral NCO" in table 3) was performed in the wavenumber range from 2170 to 2380. The build material without catalyst of comparative example CE 8 showed a value of 510 after exposure while a completely reacted film showed a value of 0. As a result a conversion of >70% of the isocyanate groups over 1 h of post-curing was sought. The NCO conversion was assumed to be related to the height of the peak area by a linear function. The starting value for comparative example CE 8 was defined as 0% conversion.

TABLE 3

"Integral NCO" after UV curing and storage at 150° C.

| Time [minutes] | Example |  |  |  |  |  |  |  |
|---|---|---|---|---|---|---|---|---|
|  | 1 | 2 | 3 | 4 | 5 | 6 | 7 | 8 |
|  | Integral NCO (Conversion [%]) |  |  |  |  |  |  |  |
| 0 | 491.9 (4) | 504.2 (1) | 498.1 (2) | 492.8 (3) | 503.0 (1) | 50.0 (90) | 471.0 (8) | 510.0 (0) |
| 30 | 143.4 (72) | 127.6 (75) | 128.5 (75) | 58.3 (89) | 129.0 (75) | 29.0 (94) | 347.0 (32) | 488.0 (4) |
| 60 | 105.6 (79) | 101.2 (80) | 87.2 (83) | 65.8 (87) | 102.0 (80) | 41.0 (92) | 290.0 (43) | 358.0 (30) |
| 240 | 53.1 (90) | 49.0 (90) | 45.8 (91) | 32.3 (94) | 76.0 (85) | 13.0 (97) | 182.0 (64) | 261.0 (49) |
| 1440 | 26.9 (95) | 34.1 (93) | 25.5 (95) | 22.1 (96) | 14.0 (97) | 11.0 (98) | 29.0 (94) | 76.0 (85) |

The inventive examples 1 to 5 showed a significantly faster decrease in the NCO integral than the comparative examples CE 6 and CE 7 containing 400 and 40 ppm of MU, respectively. While all inventive examples showed a conversion of NCO groups ≥72% after only 30 minutes storage at 150° C., in the comparative example CE 7 containing 40 ppm of MIL only 32% of the NCO groups had reacted. After 60 minutes the NCO conversion for the inventive examples is ≥79% while for comparative example CE 7 the NCO conversion is only 43%.

Even immediately after UV curing comparative example CE 6 containing 400 ppm of DBTL showed a very low NCO integral of 50.0 corresponding to a conversion of NCO groups of 90%. This is attributable to many isocyanate groups already reacting during UV exposure and sample preparation for infrared measurement as a consequence of the high DBTL amount. This is also confirmed by the viscosity measurements after different reaction times at 23° C. shown hereinabove.

While comparative example CE 8, without catalyst, also showed a reduction in the NCO integral over time this was markedly slower than in the catalyzed systems. Only after 240 minutes had approximately half of the NCO groups reacted during storage at 150° C.

In conclusion, the build materials according to inventive examples 1 to 5 containing a latently reactive catalyst showed a substantially longer pot life than the build materials catalyzed with DBTL according to comparative examples CE 6 and CE 7. At the same time the inventive build materials reacted markedly faster (NCO—OH reaction) during storage at 150° C. than a build material without catalyst, such as DBTL, having a long pot life according to comparative example CE 8. This combination of properties thus verifies the desired thermally latent action of the catalysts compared to conventional catalysis of the NCO—OH reaction using DBTL and on account of the sufficient pot lives with rapid reaction upon heating shows exceptional suitability for use in formulations such as is desired for example in 3-D printing or in coatings and adhesives applications.

The invention claimed is:

1. A process for producing an article made of a build material, wherein the build material comprises free-radically crosslinkable groups, NCO groups and groups having Zerewitinoff-active H atoms and the article is a three-dimensional article and/or a layer, comprising heating the build material during and/or after production of the article to a temperature of ≥50° C., and wherein the build material comprises one or more cyclic tin compounds of formula F-I, F-II and/or F-III:

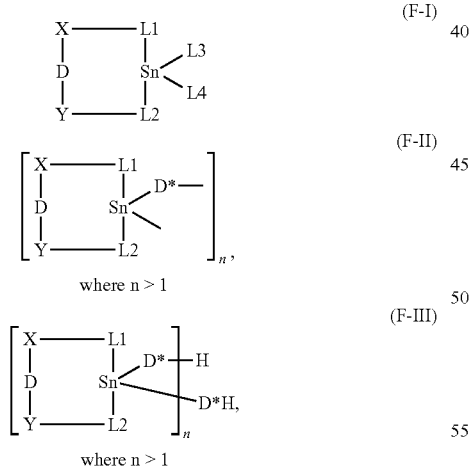

wherein:

D represents —O—, —S— or —N(R1)— wherein R1 represents a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur, nitrogen, or is hydrogen or the radical

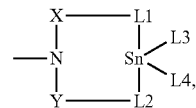

or R1 and L3 together represent —Z-L5-;

D* represents —O— or —S—;

X, Y and Z are identical or different radicals selected from alkylene radicals of formulae —C(R2)(R3)-, —C(R2)(R3)-C(R4)(R5)- or —C(R2)(R3)-C(R4)(R5)-C(R6)(R7)- or ortho-arylene radicals of formulae

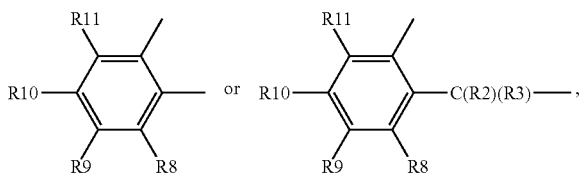

wherein R2 to R11 independently represent saturated or unsaturated, linear or branched, aliphatic or cycloaliphatic or optionally substituted aromatic or araliphatic radicals which have up to 20 carbon atoms and may optionally contain heteroatoms from the group of oxygen, sulfur, nitrogen, or are hydrogen;

L1, L2 and L5 independently represent —O—, —S—, —OC(=O)—, —OC(=S)—, —SC(=O)—, —SC(=S)—, —OS(=O)$_2$O—, —OS(=O)$_2$— or —N(R12)-, wherein R12 represents a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur, nitrogen, or is hydrogen;

L3 and L4 independently represent —OH, —SH, —OR13, —Hal, —OC(=O)R14, —SR15, —OC(=S)R16, —OS(=O)$_2$OR17, —OS(=O)$_2$R18 or —NR19R20, or L3 and L4 together represent -L1-X—D—Y-L2-, wherein R13 to R20 independently represent saturated or unsaturated, linear or branched, aliphatic or cycloaliphatic or optionally substituted aromatic or araliphatic radicals which have up to 20 carbon atoms and may optionally contain heteroatoms from the group of oxygen, sulfur, nitrogen, or are hydrogen.

2. The process as claimed in claim 1, wherein the article is a three-dimensional article and is obtained from a precursor and a process comprising the steps of:

I) depositing free-radically crosslinked build material atop a carrier to obtain a ply of a build material joined to the carrier which corresponds to a first selected cross section of the precursor;

II) depositing free-radically crosslinked build material atop a previously applied ply of the build material to obtain a further ply of the build material which corresponds to a further selected cross section of the precursor and which is joined to the previously applied ply;

III) repeating step II) until the precursor is formed;

wherein the depositing of free-radically crosslinked build material at least in step II) is effected by exposure and/or irradiation of a selected region of a free-radically crosslinkable build material corresponding to the respectively selected cross section of the precursor and wherein the free-radically crosslinkable build material has a viscosity (23° C., DIN EN ISO 2884-1) of ≥5 mPas to ≤1 000 000 mPas, wherein the free-radically crosslinkable build material comprises a curable component comprising NCO groups and olefinic C=C double bonds, and in that step III) is followed by a further step IV):
IV) heating the precursor obtained after step III) to a temperature of ≥50° C. to obtain the article.

3. The process as claimed in claim 2, wherein:
the carrier is arranged inside a container and is vertically lowerable in the direction of the gravitational force,
the container contains the free-radically crosslinkable build material in an amount sufficient to cover at least the carrier and an uppermost surface of crosslinked build material deposited on the carrier as viewed in the vertical direction,
before each step II) the carrier is lowered by a predetermined distance so that above the uppermost ply of the crosslinked build material viewed in the vertical direction a layer of the free-radically crosslinkable build material is formed and
in step II) an energy beam exposes and/or irradiates the selected region of the layer of the free-radically crosslinkable build material corresponding to the respectively selected cross section of the precursor.

4. The process as claimed in claim 2, wherein:
the carrier is arranged inside a container and is vertically raisable counter to the direction of the gravitational force,
the container provides the free-radically crosslinkable build material,
before each step II) the carrier is raised by a predetermined distance so that below the lowermost ply of the crosslinked build material viewed in the vertical direction a layer of the free-radically crosslinkable build material is formed and
in step II) a plurality of energy beams simultaneously exposes and/or irradiates the selected region of the layer of the free-radically crosslinkable build material corresponding to the respectively selected cross section of the precursor.

5. The process as claimed in claim 2, wherein:
in step II) the free-radically crosslinkable build material is applied from one or more printing heads corresponding to the respectively selected cross section of the precursor and is subsequently exposed and/or irradiated.

6. The process as claimed in claim 1, wherein the article is a coating and the process comprises the steps of:
applying the build material atop a substrate
heating and/or UV-irradiating the applied build material to effect in the applied build material an at least partial crosslinking of the free-radically crosslinkable groups
heating the applied build material to a temperature of ≥50° C. to effect in the applied build material at least in part a reaction between NCO groups and groups having Zerewitinoff-active H atoms.

7. The process as claimed in claim 1, wherein the article is an adhesive bond and the process comprises the steps of:
applying the build material atop a first substrate
contacting the applied build material with a second substrate heating and/or UV-irradiating the applied build material to effect in the applied build material an at least partial crosslinking of the free-radically crosslinkable groups
heating the applied build material to a temperature of ≥50° C. to effect in the applied build material at least in part a reaction between NCO groups and groups having Zerewitinoff-active H atoms.

8. The process as claimed in claim 1, wherein the build material further comprises a free-radical starter and/or an isocyanate trimerization catalyst.

9. The process as claimed in claim 1, wherein the build material is obtained by mixing an NCO-containing component and a component containing groups having Zerewitinoff-active H atoms and the mixing is effected ≥5 minutes before commencement of the process.

10. The process as claimed in claim 1, wherein in the definition as claimed in claim 1 D is —N(R1)- and R1 is hydrogen or an alkyl, aralkyl, alkaryl or aryl radical having up to 20 carbon atoms or the radical

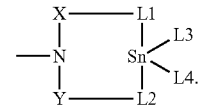

11. The process as claimed in claim 1, wherein R1 is hydrogen or a methyl, ethyl, propyl, butyl, hexyl, octyl, Ph, or CH₃Ph radical or the radical

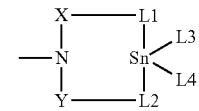

and wherein propyl, butyl, hexyl and octyl represent all isomeric propyl, butyl, hexyl and octyl radicals.

12. The process as claimed in claim 1, wherein D* is —O—.

13. The process as claimed in claim 1, wherein the cyclic tin compound is one or more of the following compounds:
4,12-di-n-butyl-1,7,9,15-tetraoxa-4,12-diaza-8-stannaspiro[7.7]pentadecane,
4,12-di-n-butyl-2,6,10,14-tetramethyl-1,7,9,15-tetraoxa-4,12-diaza-8-stannaspiro[7.7]pentadecane,
2,4,6,10,12,14-hexamethyl-1,7,9,15-tetraoxa-4,12-diaza-8-stannaspiro[7.7]pentadecane,
4,12-di-n-octyl-2,6,10,14-tetramethyl-1,7,9,15-tetraoxa-4,12-diaza-8-stannaspiro[7.7]pentadecane,
4,12-di-n-octyl-1,7,9,15-tetraoxa-4,12-diaza-8-stannaspiro[7.7]pentadecane,
4,12-dimethyl-1,7,9,15-tetraoxa-4,12-diaza-8-stannaspiro[7.7]pentadecane,
1,1-dichloro-5-methyl-5-aza-2,8-dioxa-1-stannacyclooctane,
1,1-diisopropyl-5-methyl-5-aza-2,8-dioxa-1-stannacyclooctane,
1,1-dibenzoyl-3,3,7,7-tetramethyl 5-n-octyl-5-aza-2,8-dioxa-1-stannacyclooctane,
1,1-dibenzoyl-5-n-octyl-5-aza-2,8-dioxa-1-stannacyclooctane,
1,1-bis(p-dodecylphenylsulfonyl)-5-n-octyl-5-aza-2,8-dioxa-1-stannacyclooctane,
2-benzoyloxy-6-octyl-4,8-dioxo-1,3,6,2-dioxazastannocan-2-yl benzoate or mixtures thereof.

14. An article obtained by a process as claimed in claim 1, wherein in the build direction of its production process at least in sections the article has a height of ≥1 mm.

15. A method comprising utilizing the cyclic tin compounds of formula F-I, F-II and/or F-III as defined in claim 1 as thermally latent urethanization catalysts in build materials in additive manufacturing processes.

* * * * *